US008887215B2

(12) United States Patent
Fisher (10) Patent No.: US 8,887,215 B2
(45) Date of Patent: Nov. 11, 2014

(54) TARGETED HIGH-VALUE CONTENT IN HTTP STREAMING VIDEO ON DEMAND

(71) Applicant: RGB Networks, Inc., Sunnyvale, CA (US)

(72) Inventor: Yuval Fisher, Palo Alto, CA (US)

(73) Assignee: RGB Networks, Inc., Sunnyvale, CA (US)

(*) Notice: Subject to any disclaimer, the term of this patent is extended or adjusted under 35 U.S.C. 154(b) by 0 days.

(21) Appl. No.: 13/826,421

(22) Filed: Mar. 14, 2013

(65) Prior Publication Data
US 2013/0332971 A1 Dec. 12, 2013

Related U.S. Application Data

(60) Provisional application No. 61/658,036, filed on Jun. 11, 2012.

(51) Int. Cl.
*H04N 7/173* (2011.01)
*H04N 7/10* (2006.01)
*G06F 15/16* (2006.01)
*H04N 21/266* (2011.01)

(52) U.S. Cl.
CPC .................. *H04N 21/266* (2013.01)
USPC ............... 725/93; 725/32; 709/246

(58) Field of Classification Search
CPC ..................................................... H04N 21/00
USPC ............................................. 725/93; 709/231
See application file for complete search history.

(56) References Cited

U.S. PATENT DOCUMENTS

| 2011/0004897 | A1* | 1/2011 | Alexander et al. | 725/32 |
|---|---|---|---|---|
| 2011/0161086 | A1* | 6/2011 | Rodriguez | 704/270 |
| 2011/0161409 | A1* | 6/2011 | Nair et al. | 709/203 |
| 2012/0005365 | A1* | 1/2012 | Ma et al. | 709/231 |
| 2012/0079529 | A1* | 3/2012 | Harris et al. | 725/32 |
| 2012/0179833 | A1* | 7/2012 | Kenrick et al. | 709/231 |
| 2012/0236201 | A1* | 9/2012 | Larsen et al. | 348/468 |
| 2012/0265901 | A1* | 10/2012 | Swenson et al. | 709/246 |
| 2012/0317485 | A1* | 12/2012 | Ding et al. | 715/719 |
| 2013/0163598 | A1* | 6/2013 | Jacobson et al. | 370/394 |
| 2013/0166906 | A1* | 6/2013 | Swaminathan et al. | 713/155 |

OTHER PUBLICATIONS

HTTP Live Streaming Resources—Apple Developer, 2 pages, retrieved on May 14, 2013, <URL: https://developer.apple.com/resources/http-streaming/>.
Apple Developer, HTTP Live Streaming Overview, 36 pages, Apr. 1, 2011.
HTTP Dynamic Streaming/Features, 1 page, retrieved on May 14, 2013, <URL:http://www.adobe.com/products/hds-dynamic-streaming/features_sl_id-con . . . >.

(Continued)

*Primary Examiner* — Nasser Goodarzi
*Assistant Examiner* — Tariq Gbond
(74) *Attorney, Agent, or Firm* — Lipsitz & McAllister, LLC (57) ABSTRACT

Methods and apparatus are provided for combining assets for a streaming video signal. Video assets are provided in an adaptive bit rate format. The video assets may comprise fragments of various types of video content. A stitched manifest identifying a combination of the video assets is created in response to a client request for one or more of the video assets. The stitched manifest is provided to a client and used by the client to request the combination of video assets for playback as one continuous video stream in an order specified by the stitched manifest.

19 Claims, 5 Drawing Sheets

(56) References Cited

OTHER PUBLICATIONS

Smooth /Streaming: The Official Microsoft IIS Site, 2 pages, retrieved on May 17, 2013, <URL:http://www.iis.net/downloads/microsoft/smooth-streaming>.

Overview of MPEG-DASH Standard for Promotion of MPEG-DASH, 3 pages, retrieved on May 14, 2013, <URL:http://dashif.org/mpeg-dash/>.

Adaptive Streaming—WHATWG Wiki, 6 pages, retrieved on Feb. 4, 2013, <URL:http://wiki.whatwg.org/wiki/Adaptive_Streaming>.

* cited by examiner

TARGETED HIGH-VALUE CONTENT IN HTTP STREAMING VIDEO ON DEMAND

This application claims the benefit of U.S. Provisional Patent Application No. 61/658,036, filed Jun. 11, 2012, which is incorporated herein and made a part hereof by reference.

BACKGROUND OF THE INVENTION

The present invention relates to the delivery of video content, such as advertisements or movies, to users using HTTP streaming with multiple high-value features, including efficient load-balancing, user-specific watermarking, and Uniform Resource Locator (URL) obfuscation.

The explosion of streaming video on Internet Protocol (IP) networks has led to the development of so-called Adaptive Hypertext Transfer Protocol (HTTP) Streaming protocols for video (also referred to as "adaptive bit rate" formats). While there are multiple instantiations of these protocols, they share the following features: (a) a video stream is broken into short, several-second-long files which are downloaded by a client and played sequentially to form a seamless video view; (b) these files, or "fragments" of video content, may be encoded at different bit rates and resolutions (referred to as "profiles") to provide several versions of each fragment; (c) a manifest file is used to identify the fragments and let the client know the various available profiles, so that it can select which fragments to download based on local conditions, such as the available download bandwidth; and (d) in a typical scenario, the client may start downloading fragments at low resolution and low bandwidth and then switch to downloading fragments from higher bandwidth profiles, giving the user a fast tune-in experience and subsequent better video quality experience.

In a video-on-demand (VOD) scenario, the fragments from different profiles may be stored on disk or other mass storage devices for delivery via HTTP, but this forces video programs (also referred to herein as "assets") to be composed of many separate files, which complicates content management. Thus, the fragments can be stored in a single aggregated file from which they are extracted "just-in-time" (JIT) when a client makes a request for a specific fragment.

The leading HTTP streaming formats in use currently are Apple® HTTP Live Streaming (HLS), Microsoft® Smooth Streaming (MSS), Adobe® HTTP Dynamic Streaming (HDS), and MPEG Dynamic Adaptive Streaming over HTTP (DASH). A just-in-time Packager (JITP) is a process that enables extraction of fragments from an aggregated collection (or a mezzanine file) and distribution of the extracted fragments over HTTP in these or other HTTP streaming formats.

A normal JITP can serve files from a single asset, but it cannot serve a collection of assets contiguously in response to one VOD request. It would be advantageous to provide a system in which a collection of assets can be served contiguously in response to one VOD request, whether coming from a JITP or from other origins. It would be further advantageous to provide methods for contiguously serving a collection of assets to a client in response to a single VOD request.

The methods and apparatus of the present invention provide the foregoing and other advantages.

SUMMARY OF THE INVENTION

The present invention relates to methods and apparatus for combining assets for a streaming video signal.

In an example embodiment of a method for combining assets for a streaming video signal in accordance with the present invention, video assets are provided in an adaptive bit rate format. The video assets comprise fragments of various types of video content. A stitched manifest identifying a combination of the video assets is created in response to a client request for one or more of the video assets. The stitched manifest is provided to a client and used by the client to request the combination of video assets for playback as one continuous video stream in an order specified by the stitched manifest.

In a further example embodiment of a method for combining assets for a streaming video signal in accordance with the present invention, video programs and additional video content files are provided in an adaptive bit rate format. Therefore, for each of a plurality of video programs, several versions of each of the video programs are provided, and each version is comprised of sets of fragmented files pre-encoded at correspondingly different bit rates, codecs or resolutions in an adaptive bit rate format, each set of the fragmented files being identified in a corresponding manifest file. Similarly, for each of a plurality of additional video content files, several versions of each of the additional video content files are provided, and each version is comprised of sets of fragmented files pre-encoded at correspondingly different bit rates, codecs or resolutions in an adaptive bit rate format, each set of the fragmented files of the additional video content files being identified in a corresponding additional manifest file. The manifest files and the additional manifest files identify a source location of the corresponding sets of video fragments and additional video fragments. An asset list is provided identifying the video programs and the additional video content files as video assets. A stitcher is provided for ingesting the asset list, the manifest files, and the additional manifest files and responding with a stitched manifest. The stitched manifest comprises a playlist combining one or more of the video fragments or the additional video fragments of one or more of the video assets. The stitched manifest is then provided to a client, where it is used to request the one or more fragments of the video assets for playback as one continuous video stream in an order specified by the stitched manifest.

The video assets may be, for example, JIT packaging assets or other stored assets. The stitcher may be included as part of a JIT packager or provided as a separate component. Thus, the one or more video assets may be provided to the client using just-in-time packaging. The JIT packager may provide the manifest files and the additional manifest files to the stitcher. The asset list is provided to the stitcher from local storage or in the client manifest request. In addition, the JIT packager may provide the one or more video assets in response to the client request.

The additional video content files may comprise at least one of advertisements, movie previews, public service announcements, movie ratings information, additional video programs, movie or video pre-rolls, programs from different video assets that are desired to be played in sequence, or the like.

Uniform resource locators (URLs) may be used to identify the video fragments and the additional video fragments in the stitched manifest.

In one example embodiment of the present invention, a new URL may be created for each video fragment and each additional video fragment. One of a database or a fixed mapping may be created or provided associating the new URL with an original URL for each video fragment and additional video fragment. The new URLs for the video fragments and additional video fragments may be combined on the stitched manifest. In such an example embodiment, when a request is received from a client for one of the new URLs at the stitcher, the original URL associated with the new URL is identified at the stitcher, and the video fragment or additional video fragment corresponding to the identified new URL is requested from a source (e.g., a video server, content server, or JIT packager) via the stitcher.

The video programs and additional video content files may be delivered using HTTP Live Streaming protocol. The stitched manifest may combine the new URLs of the video fragments and the additional video fragments in sequence for sequential playback at the client.

The video fragments and additional video fragments may be delivered using one of Microsoft® Smooth Streaming (MSS), Adobe® HTTP Dynamic Streaming (HDS), or Dynamic Adaptive Streaming over HTTP (DASH) protocols.

Where the URLs are timestamp-based, each of the video fragments or the additional video fragments have a corresponding timestamp. In such an example embodiment, the stitcher may provide modified timestamps to each new URL. The timestamps of the new URLs may be modified to account for a duration of a previous video fragment or additional video fragment.

Where the URLs are sequence number-based, each of the video fragments or the additional video fragments having a corresponding sequence number. In such an example embodiment, the stitcher may provide modified sequence numbers to each new URL. The sequence numbers of the new URLs may be modified to increase with each of the fragments of the one or more video assets identified on the stitched manifest in sequential order of playback. The stitcher maps the modified sequence numbers to the original sequence numbers to enable retrieval of the requested content.

In a further example embodiment, the additional video content files may comprise advertisements. In such an example embodiment, a placeholder may be provided in the asset list in place of information identifying the additional video content. Upon receipt of a request for a stitched manifest from the client, a specific advertisement may be selected for communication to the client that is related to the client or the one or more video assets subject to the request. The stitched manifest is then created by substituting identification information for the specific advertisement into the asset list in place of the placeholder. The stitched manifest is then provided to the client in response to the request for the stitched manifest. The stitched manifest is then used by the client to play back the requested video asset and the specific advertisement.

A plurality of stitchers may be provided in a video-on-demand system. Playlist servers may be provided to serve the stitched manifest to clients. Load information may be passed from the stitchers to the playlist servers. Load balancing of high-bandwidth-using stitchers may be achieved by enabling the low-bandwidth-using and externally load-balanced playlist servers to select a lightly loaded stitcher from the plurality of stitchers for delivery of the one or more video assets.

In another example embodiment of the present invention, two versions of each video asset may be provided to the stitcher, where the fragments of each version may have a different watermark embedded therein. A unique sequence may then be created comprised of watermarked fragments from the two versions of the watermarked video assets at the stitcher in order to send a different unique sequence to each client. The client's IP address or other identifying information may be encoded in the unique sequence.

The present invention may also include corresponding apparatus for carrying out the methods discussed above. In one example embodiment, a stitcher is provided for combining assets for a streaming video signal in a video distribution environment. In such a distribution environment, one or more video servers store, for each of a plurality of video programs, several versions of each of the video programs comprised of sets of fragmented files pre-encoded at correspondingly different bit rates, codecs or resolutions in an adaptive bit rate format, each set of the fragmented files being identified in a corresponding manifest file stored together therewith. In addition, one or more content servers store, for each of a plurality of additional video content files, several versions of each of the additional video content files comprised of sets of fragmented files pre-encoded at correspondingly different bit rates, codecs or resolutions in an adaptive bit rate format, each set of the fragmented files of the additional video content files being identified in a corresponding additional manifest file stored together therewith. The manifest files and the additional manifest files identify a source location of the corresponding sets of video fragments and additional video fragments. An asset list identifies the video programs and the additional video content files as video assets. The stitcher comprises a manifest combiner for ingesting the asset list, the manifest files, and the additional manifest files and responding with a stitched manifest, the stitched manifest comprising a playlist combining one or more of the video fragments or the additional video fragments of one or more of the video assets. The manifest combiner provides the stitched manifest to a client, the stitched manifest being used at the client to request the one or more fragments of the video assets for playback. The stitcher may also comprise a fragment proxy for obtaining the one or more fragments of the video assets from the one or more video servers or the one or more content servers and delivering the one or more fragments of the video assets to the client as one continuous video stream in an order specified by the stitched manifest.

The stitcher also comprises various features and elements for carrying out the various methods discussed above, including but not limited to a database for URL mapping and/or a mapping algorithm for mapping original URLs to newly created URLs.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
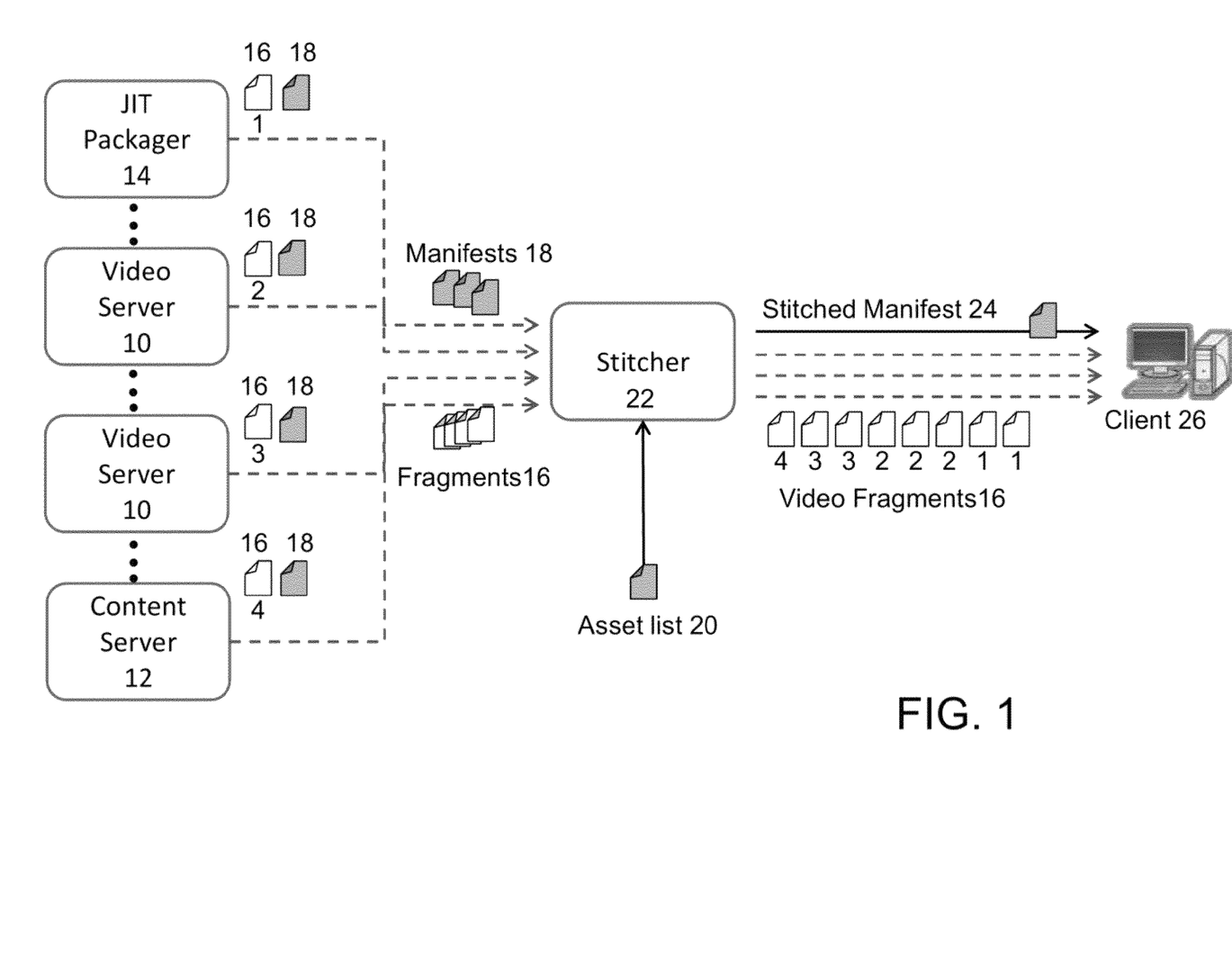
FIG. 1 is a block diagram showing an example embodiment of the present invention, illustrating the return of a stitched manifest and the provision of video content to a client.

FIG. 1 shows a block diagram of an example embodiment of the present invention for combining assets for a streaming video signal. Video programs and additional video content files are provided in an adaptive bit rate format by corresponding servers (video servers 10 or content servers 12) or just-in-time packagers 14. Therefore, for each of a plurality of video programs, several versions of each of the video programs are provided, and each version is comprised of sets of fragmented files 16 pre-encoded at correspondingly different bit rates, codecs or resolutions in an adaptive bit rate format, each set of the fragmented files 16 being identified in a corresponding manifest file 18. Similarly, for each of a plurality of additional video content files, several versions of each of the additional video content files are provided, and each version is comprised of sets of fragmented files 16 pre-encoded at correspondingly different bit rates, codecs or resolutions in an adaptive bit rate format, each set of the fragmented files 16 of the additional video content files being identified in a corresponding additional manifest file 18. The manifest files and the additional manifest files 18 identify a source location of the corresponding sets of video fragments 16 and additional video fragments 16. An asset list 20 is provided identifying the video programs and the additional video content files as video assets. A stitcher 22 is provided for ingesting the asset list 20, the manifest files 18, and the additional manifest files 18 and responding with a stitched manifest 24. The stitched manifest 24 comprises a playlist combining one or more of the video fragments 16 or the additional video fragments 16 of one or more of the video assets. The stitched manifest 24 is then provided to a client 26, where it is used to request the one or more fragments 16 of the video assets for playback as one continuous video stream in an order specified by the stitched manifest 24.

Although FIG. 1 shows the stitcher 22 as a separate component, it should be appreciated that the stitcher may be included as part of a JIT packager 14. Thus, the video assets may be provided to the client 26 using just-in-time packaging. The JIT packager 14 may provide the manifest files 18 and the additional manifest files 18 to the stitcher. The asset list 20 may be provided to the stitcher 22 either from local storage or in the client 26 request for the stitched manifest 24. In addition, the JIT packager 14 may provide the fragments 16 of the one or more video assets in response to the client request.

The asset list 20 may be stored at the playlist server, at an external content management system (CMS) 54 (as discussed below in connection with FIG. 4), or at any external storage component.

Further, it should be appreciated that the JIT packager(s) 14 may function as another video server 10 or content server 12, and therefore it should be appreciated that wherever a video server 10 or content server 12 is mentioned herein, a JIT packager 14 may be substituted therefore.

The additional (or original) video content files (from content server(s) 12) may comprise at least one of advertisements, movie previews, public service announcements, movie ratings information, additional video programs, movie or video pre-rolls, programs from different video assets that are desired to be played in sequence, or the like.

Manifests in HTTP streaming use one of two methods to specify the uniform resource locators (URLs) of the fragments. HTTP Live Streaming (HLS), which allows streaming of live and on-demand video and audio to an Apple® iPhone®, iPad®, or iPod® Touch, uses complete URLs in its manifests. The client requests the URLs in the manifests and plays the fragments sequentially. Microsoft® Smooth Streaming (MSS) and Adobe® HTTP Dynamic Streaming (HDS) use a template URL in which a time stamp or sequence number is used to refer to specific fragments.

Similarly, URLs may be used to identify the video fragments 16 and the additional video fragments 16 in the stitched manifest 24. In the stitched manifest 24, the timestamps or sequence numbers of the URLs can be updated to calculate the timestamp or sequence number of the next fragment from the previous fragment. For MSS, for example, the duration of a fragment is added to its timestamp in order to compute the timestamp of the next fragment. Dynamic Adaptive Streaming over HTTP (DASH) uses a mixture of both techniques.

Figure 2:
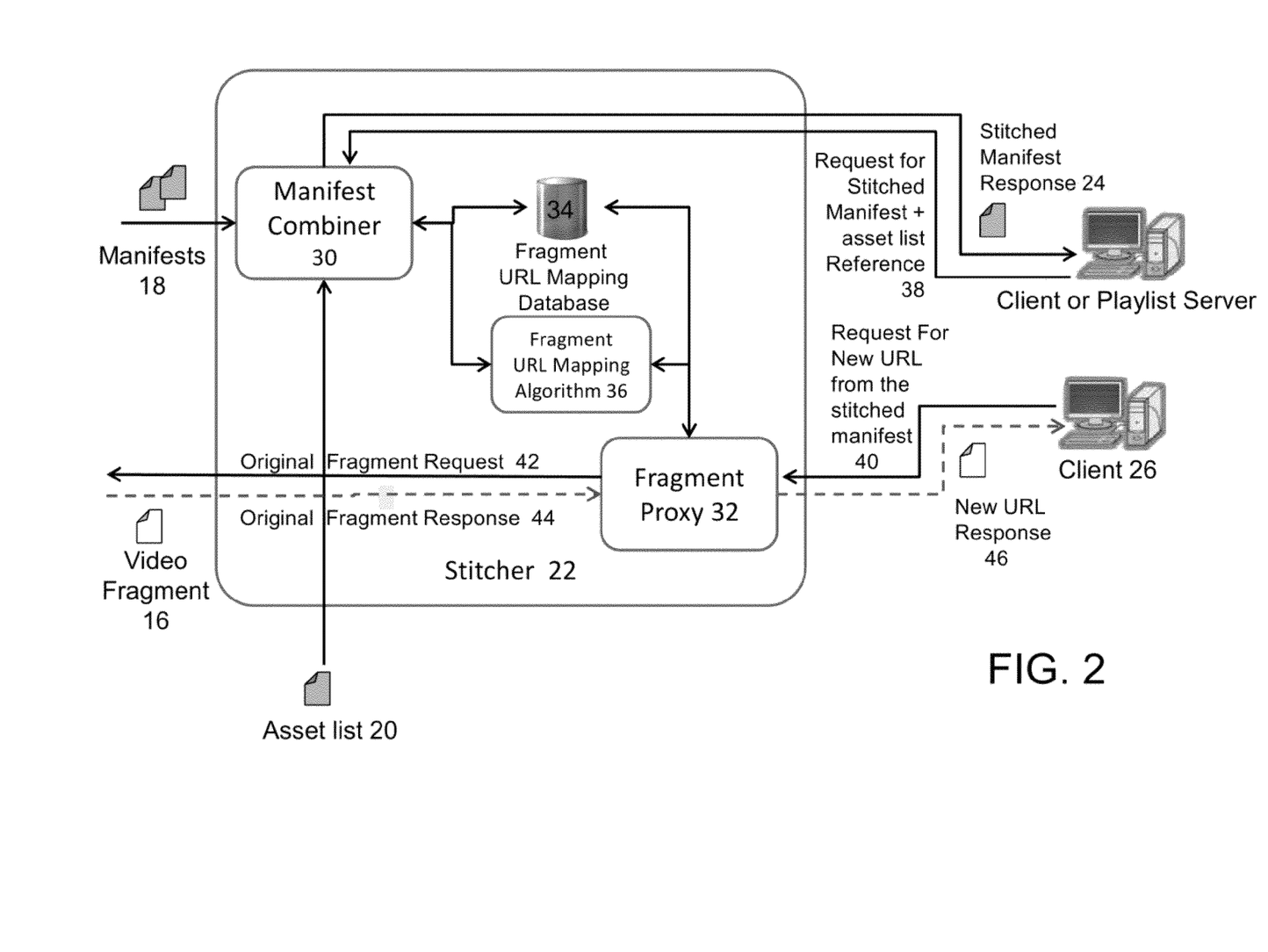
FIG. 2 is a block diagram showing an example embodiment of a stitcher in accordance with the present invention.

FIG. 2 shows a block diagram of an example embodiment of a stitcher 22 in accordance with the present invention. The stitcher 22 may comprise a manifest combiner 30 for ingesting the asset list 20, the manifest files 18, and the additional manifest files 18, and responding to the client 26 with a stitched manifest 24. The manifest combiner 30 provides the stitched manifest 24 to the client 26 in response to a client request 38. The stitcher 22 also comprises a fragment proxy 32 receiving a request 40 for a content fragment 16 from the client 26 (as identified in the stitched manifest 24) and requesting 42 and receiving 44 the one or more fragments 16 of the video assets from the one or more video servers 10 or the one or more content servers 12 (or one or more JIT packagers 14). The fragment proxy 32 then delivers the one or more fragments 16 of the video assets to the client 26 for each sequential request 40 to form one continuous video stream at the client 26 in an order specified by the stitched manifest 24.

Figure 3:
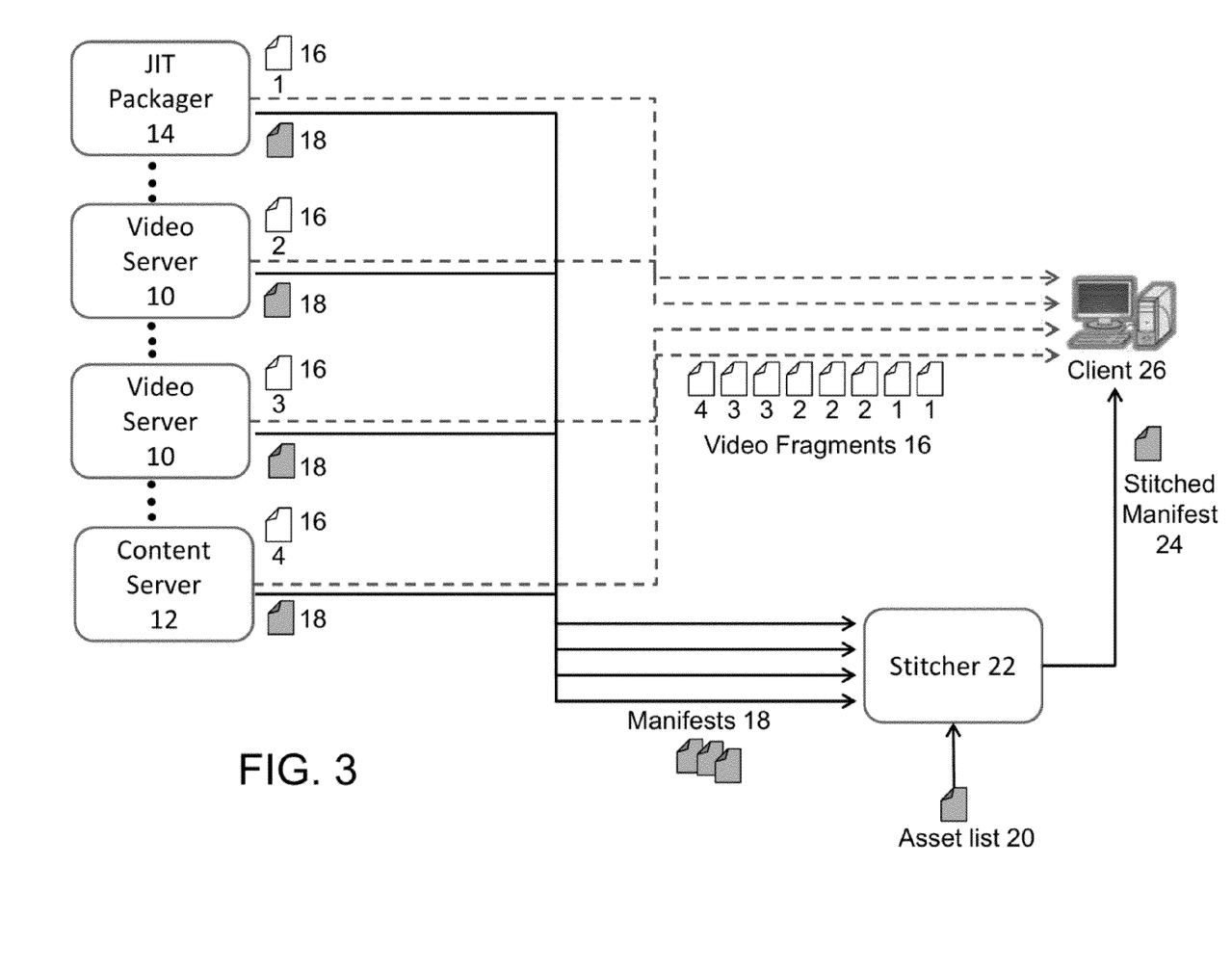
FIG. 3 is a block diagram showing a further example embodiment of the present invention.

In an alternate embodiment as shown in FIG. 3, fragments 16 with original URLs can be served directly to the client from the corresponding video server 10, content server 12, or JIT packager 14. In such an example embodiment, the manifest files 18 are provided to the stitcher 22 for use in creating the stitched manifest 24, and the stitcher 22 receives the request for content from the client 26 and communicates this request to the servers 10, 12, 14, which provide the requested fragments 16 to the client directly. For example, such an embodiment is suitable for the case of HLS-type URL playlists, so that the URLs can be combined and played in sequence.

In a further example embodiment of the present invention, a new URL may be created for each video fragment 16 and each additional video fragment 16. A database 34 and/or a fixed mapping algorithm 36 (as shown in FIG. 2) may provided at the stitcher 22 associating the new URL with an original URL for each video fragment 16 and additional video fragment 16. The new URLs for the video fragments 16 and additional video fragments 16 may be combined on the stitched manifest 24. In such an example embodiment, when a request is received from a client 26 for one of the new URLs at the stitcher 22, the original URL associated with the new URL is identified at the stitcher 22 using the database 34 and/or the mapping algorithm 36, and the video fragment 16 or additional video fragment 16 corresponding to the identified new URL is requested from a source (e.g., a corresponding video server 10, content server 12, or JIT packager 14) via the stitcher 22.

This allows all URLs in the stitched manifest 24 to have the same format and to refer to the same server and path namespace. This has the advantage that it is not readily possible to differentiate (and thus excise) advertisement URLs from the network program URLs in order to allow advertisements to be skipped.

The video fragments 16 and additional video fragments 16 may be delivered using one of Microsoft® Smooth Streaming (MSS), Adobe® HTTP Dynamic Streaming (HDS), or Dynamic Adaptive Streaming over HTTP (DASH) protocols. The video programs and the additional video content files may also be delivered using HTTP Live Streaming protocol. The stitched manifest 24 may combine the URLs of the video fragments 16 and the additional video fragments 16 in sequence for sequential playback at the client 26.

Normally, the URLs for different assets using HDS- or MSS-type URLs have different name spaces. That is, the path portion of the URL is different. This makes playing different assets contiguously impossible, since the client 26 will not know when to stop updating timestamps or sequence numbers and to change namespaces. However, the stitcher 22 can map the path portion (or any other portion of the URL) using its internal database 34, so that a single namespace in the stitched manifest 24 is converted into internal requests from multiple namespaces. The stitcher 22 effectively serves as a proxy that returns with sequential fragments 16 from multiple assets based on a manifest 24 with just one name space.

Where the URLs are timestamp-based, each of the video fragments 16 or the additional video fragments 16 have a corresponding timestamp. In the case of timestamp-based URLs, the client 26 will use a fragment's duration to compute the next timestamp. Thus, the stitched playlist 24 must use consistent timestamps that account for the duration of each fragment 16. In such an example embodiment, the stitcher 22 may provide modified timestamps to each new URL. The timestamps of the new URLs may be modified to account for a duration of a previous video fragment 16 or additional video fragment 16.

In particular, if the asset $A_1$ in the asset list 20 has time stamps, $T_{1,1}, \ldots, T_{1,N1}$, with asset A2 having time stamps $T_{2,1}, \ldots, T_{2,N2}$, etc, then the stitched playlist 24 will have timestamps:

$$T_{1,1}, \ldots, T_{1,N1},$$
$$[\text{--first asset--}]$$

$$((T_{2,2} - T_{2,1}) + T_{1,N1}), ((T_{2,3} - T_{2,1}) + T_{1,N1}), \ldots, (T_{2,N2} - T_{2,1}) + T_{1,N1}), \ldots, \ldots$$
$$[\text{---------second asset-----------------}]$$

The first term of the timestamps for the second asset ensures that adding the duration of the first fragment of asset $A_2$ to the last time stamp of the last fragment of asset $A_1$ will create the timestamp for the first asset of $A_2$, etc.

Where the URLs are sequence number-based URLs, each of the video fragments 16 or the additional video fragments 16 having a corresponding sequence number. In such an example embodiment, the stitcher 22 may provide modified sequence numbers to each new URL. The sequence numbers of the new URLs may be modified to increase with each of the fragments 16 of the one or more video assets identified on the stitched manifest 24 in sequential order of playback. The stitcher 22 maps (e.g., via the mapping algorithm 36) the modified sequence numbers to the original sequence numbers to enable retrieval of the requested content.

The stitcher 22 may also combine sub-portions of programs by selecting a portion of the manifest 18 for an asset for inclusion in the stitched manifest 24. The sub-portion can be defined by start and stop timestamps or sequence numbers, or by selecting a subset of the URLs in an HLS-style manifest.

Figure 4:
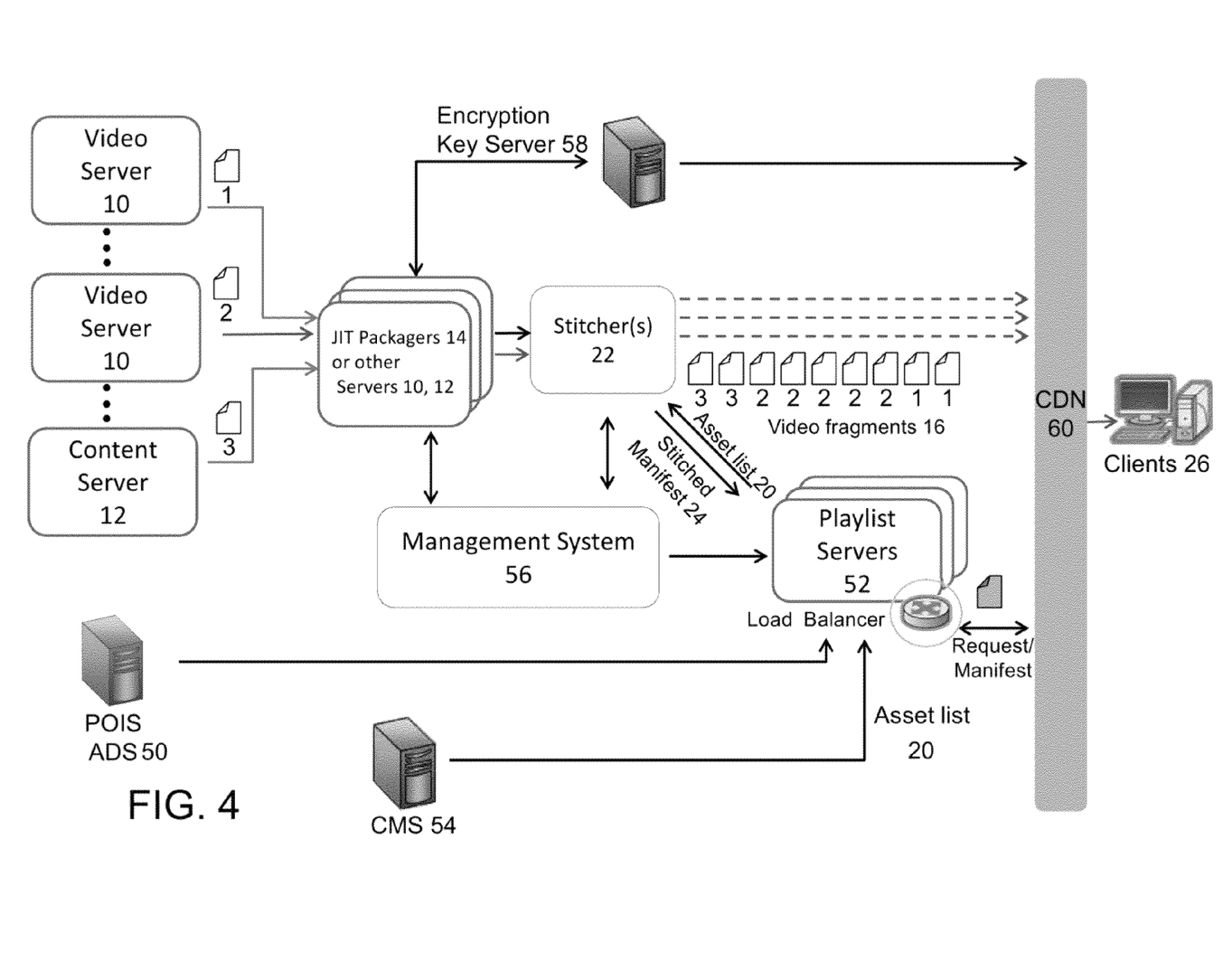
FIG. 4 is a block diagram showing a further example embodiment of the present invention, illustrating the return of a stitched manifest and the insertion of targeted advertisement content to a client, as well as load balancing.

In a further example embodiment, the additional video content files provided by the content servers 12 may comprise advertisements (in particular, targeted advertisements). FIG. 4 shows a block diagram of such an example embodiment of the invention. A placeholder may be provided in the asset list 20 in place of information identifying the additional video content. Upon receipt of a request for a stitched manifest 24 from the client 26, a specific advertisement may be selected for communication to the client 26 that is related to the client or the one or more video assets subject to the request. The stitched manifest 24 is then created by substituting identification information for the specific advertisement into the asset list 20 in place of the placeholder. The stitched manifest 24 is then provided to the client 26 in response to the request for the stitched manifest. The stitched manifest 24 is then used by the client 26 to play back the requested video asset and the specific advertisement.

In particular, as shown in FIG. 4, a placement opportunity information server/ad decision server (POIS/ADS) 50 is used to serve ad decisions to playlist servers 52. The playlist servers 52 may be used to serve the stitched manifests 24 to the client 26 in response to the client request, and to convert the placeholders in the stitched manifest 24 into specific advertisement identification information obtained from the POIS/ADS 50. When a client 26 makes a request for a stitched manifest 24, the playlist server 52 connects to the ADS 50, requests specific ads for the client 26 and the content that is to be viewed, converts the advertisement placeholders into requests for specific assets, fetches the stitched manifest 24 and returns it to the client 26. The client 26 then plays back the content by making requests directly to the stitcher 22 based on the URLs in the stitched manifest 24. A content management system (CMS) 54 may be used to store the asset lists 20 and templates for the asset lists 20 (an asset list template may be an asset list with a placeholder for an advertisement).

A management system 56 may be provided to manage and integrate the components of the system. An encryption key server 58 may be used with the JIT packager 14 to encrypt the fragments 16. Content may be provided directly by the JIT packager(s) 14 or from video servers 10 and content servers 12 through the JIT packagers 14. Communication with the client(s) 26 may take place over a content delivery network (CDN) 60.

In accordance with a further example embodiment of the present invention, efficient load balancing is provided. Normally, video servers that service large numbers of clients (as may be expected to be the case at video service providers that offer VOD service) must be load balanced to deal with the large number of HTTP requests made by large numbers of clients connecting simultaneously. Using the architecture described herein has the advantage that only the low bandwidth-using playlist servers 52 need to be load balanced. The playlist servers 52 can then load balance the stitchers 22 and/or JIT Packagers 14 as is shown in FIG. 4. It should be noted that the bulk of utilized bandwidth is in the delivery of the fragments, and the onus of load balancing this traffic is eliminated.

In such a load balancing example embodiment, a plurality of stitchers 22 may be provided in a video-on-demand system. Multiple playlist servers 52 may be provided to serve the stitched manifest 24 to clients 26. Load information may be passed from the stitchers 22 to the playlist servers 52. Load balancing of high-bandwidth-using stitchers 22 may be achieved by enabling the low-bandwidth-using and externally load-balanced playlist servers 52 to select a lightly loaded stitcher 22 from the plurality of stitchers 22 for delivery of the one or more video assets.

Another example embodiment of the present invention enables unique watermarking technique. In such an example embodiment, two versions of each video asset may be provided to the stitcher 22, where the fragments 16 of each version may have a different watermark embedded therein. A unique sequence may then be created comprised of watermarked fragments from the two versions of the watermarked video assets at the stitcher 22 in order to send a different unique sequence to each client 26. The client's IP address or other identifying information may be encoded in the unique sequence.

Figure 5:
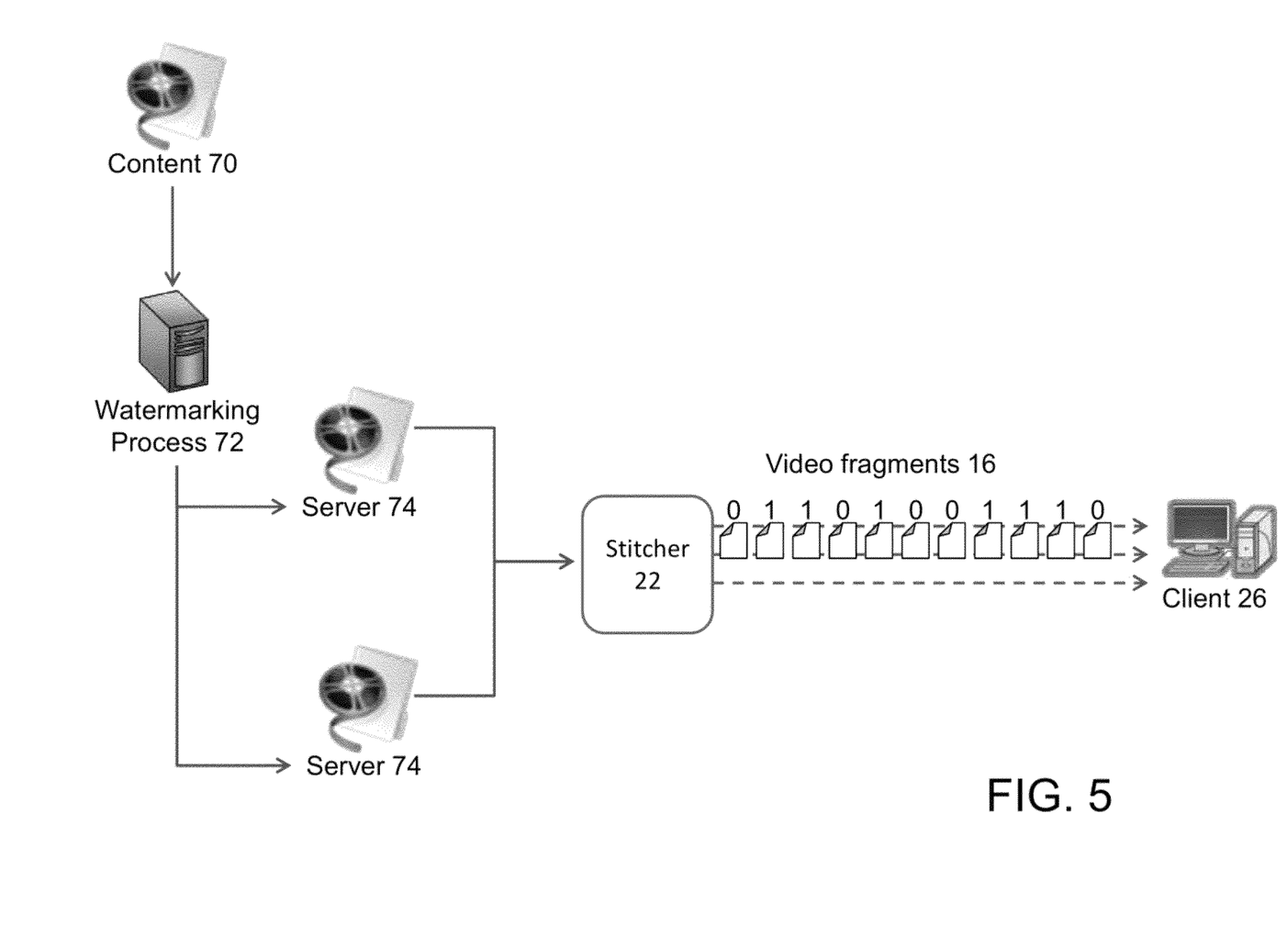
FIG. 5 is a block diagram showing a further example embodiment of the present invention, illustrating the packaging of watermarked assets and delivery of these assets to clients.

FIG. 5 shows a block diagram of an example embodiment of such a watermarking embodiment. The content 70 is subject to an external watermarking process 72 and different watermarked versions of the content 70 (or fragments of the content 70) are stored at one or more video servers or content servers 74. As with the embodiments discussed above, the fragments of the watermarked content 70 are identified in a manifest file 18 provided to the stitcher 22, which creates the unique sequence of watermarked fragments in response to the client request for content.

There are multiple techniques for adding so-called 'watermarks' to video, audio, and transport data. These watermarks are designed to not interfere with the data in which they are embedded, but to be extractable later. The specific method of watermarking is not important to the present invention; any of a myriad of different techniques can be used.

Content owners use watermarks as a deterrent to piracy, since pirated content can be traced back to the user that distributed it by extracting the user-specific watermark in the content. However, creating a watermark for each user can be computationally demanding. The present invention provides a method for using only two different watermarks and the stitcher 22 to create individually targeted watermarks for effectively arbitrarily many different users.

More particularly, an asset may be watermarked twice using two different watermarks. The fragments from each version of the watermarked content 70 are aligned so that they start and stop at the same frames. The stitcher 22 may be used to select fragments 16 from each version in such a way as to create a unique sequence of alternate versions that can be used to identify the receiving client 26. The alternating fragments can be used to encode the client's IP address or other identifying information. It should be noted that a specific advantage of this technique is that the "0" and "1" chunks can be cached in a CDN, which is not normally the case with watermarks that target specific users.

It should now be appreciated that the present invention provides advantageous methods and apparatus for combining different assets for continuous playback in a streaming video signal.

Although the invention has been described in connection with various illustrated embodiments, numerous modifications and adaptations may be made thereto without departing from the spirit and scope of the invention as set forth in the claims.

What is claimed is:

1. A method for combining assets for a streaming video signal in a video-on-demand environment, comprising:

providing, for each of a plurality of video programs, several versions of each of the video programs comprised of sets of fragmented files pre-encoded at correspondingly different bit rates, codecs or resolutions in an adaptive bit rate format, each set of the fragmented files being identified in a corresponding manifest file;

providing, for each of a plurality of additional video content files, several versions of each of the additional video content files comprised of sets of fragmented files pre-encoded at correspondingly different bit rates, codecs or resolutions in an adaptive bit rate format, each set of the fragmented files of the additional video content files being identified in a corresponding additional manifest file;

the manifest files and the additional manifest files identifying a source location of the corresponding sets of video fragments and additional video fragments;

providing an asset list identifying the video programs and the additional video content files as video assets;

providing a stitcher for ingesting the asset list, the manifest files, and the additional manifest files and responding with a stitched manifest, the stitched manifest comprising identifiers for one or more of the video fragments or the additional video fragments of one or more of the video assets;

providing the stitched manifest to a client in response to a client request for the stitched manifest; and using said stitched manifest at the client to request the one or more fragments of the video assets in sequence for sequential playback as one continuous video stream in an order specified by the stitched manifest;

the identifiers comprising uniform resource locators (URLs) which are used to identify the video fragments and the additional video fragments in the stitched manifest;

creating a new URL for each video fragment and each additional video fragment;

creating one of a database or a fixed mapping associating the new URL with an original URL for each video fragment and additional video fragment;

combining the new URLs for the video fragments and additional video fragments on the stitched manifest;

receiving the client request at the stitcher;

identifying the original URL associated with the new URL at the stitcher; and requesting the video fragment or additional video fragment corresponding to the identified new URL from the source location via the stitcher.

2. A method in accordance with claim 1, wherein:

the one or more video assets are provided to the client using just-in-time packaging;

a just-in-time packager provides the manifest files, the additional manifest files, and the asset list to the stitcher; and the just-in-time packager provides the one or more video assets in response to the client request for the one or more fragments of the video assets.

3. A method in accordance with claim 1, wherein the additional video content files comprise at least one of advertisements, movie previews, public service announcements, movie ratings information, additional video programs, movie or video pre-rolls, or programs from different video assets that are desired to be played in sequence.

4. A method in accordance with claim 1, wherein:

the video programs and the additional video content files are delivered using HTTP Live Streaming protocol; and the stitched manifest combines the URLs of the video fragments and the additional video fragments in sequence for sequential playback at the client.

5. A method in accordance with claim 1, wherein:
the video programs and additional video content files are delivered using HTTP Live Streaming protocol; and
the stitched manifest combines the new URLs of the video fragments and the additional video fragments in sequence for sequential playback at the client.

6. A method in accordance with claim 1, wherein:
the video fragments and additional video fragments are delivered using one of Microsoft® Smooth Streaming (MSS), Adobe® HTTP Dynamic Streaming (HDS), or Dynamic Adaptive Streaming over HTTP (DASH) protocols.

7. A method in accordance with claim 6, wherein:
the URLs are timestamp-based, each of the video fragments or the additional video fragments having a corresponding timestamp;
the stitcher provides modified timestamps to each new URL; and
the timestamps of the new URLs are modified to account for a duration of a previous video fragment or additional video fragment.

8. A method in accordance with claim 6, wherein:
the URLs are sequence number-based URLs, each of the video fragments or the additional video fragments having a corresponding sequence number;
the stitcher provides modified sequence numbers to each new URL;
the sequence numbers of the new URLs are modified to increase with each of the fragments of the one or more video assets identified on the stitched manifest in sequential order of playback; and
the stitcher maps the modified sequence numbers to the original sequence numbers to enable retrieval of the requested content.

9. A method in accordance with claim 1, wherein the additional video content files comprise advertisements, further comprising:
providing a placeholder in the asset list in place of information identifying the additional video content;
upon receipt of the request for the stitched manifest from the client, selecting a specific advertisement for communication to the client that is related to the client or the one or more video assets subject to the request;
creating the stitched manifest by substituting identification information for the specific advertisement into the asset list in place of the placeholder;
providing the stitched manifest to the client in response to the request for the stitched manifest; and
using the stitched manifest by the client to play back the requested video asset and the specific advertisement.

10. A method in accordance with claim 1, further comprising:
providing a plurality of stitchers in a video-on-demand system;
providing playlist servers to serve the stitched manifest to clients;
passing load information from the stitchers to the playlist servers; and
load balancing high-bandwidth-using stitchers by enabling the low-bandwidth-using and externally load-balanced playlist servers to select a lightly loaded stitcher from the plurality of stitchers for delivery of the one or more video assets.

11. A method in accordance with claim 1, further comprising:
providing two versions of each video asset to the stitcher, the fragments of each version having a different watermark embedded therein; and
creating a unique sequence comprised of watermarked fragments from the two versions of the watermarked video assets at the stitcher in order to send a different unique sequence to each client.

12. A method in accordance with claim 11, further comprising:
encoding the client's IP address or other identifying information in the unique sequence.

13. A method for combining video assets for a streaming video signal in a video-on-demand environment, comprising:
providing, for each of a plurality of video assets, several versions of each of the video assets pre-encoded at correspondingly different bit rates, codecs or resolutions in an adaptive bit rate format, said video assets comprising fragments of various types of video content;
creating a stitched manifest comprising identifiers for a combination of different video assets from the plurality of video assets in response to a client request for the different video assets;
providing the stitched manifest to a client in response to the client request; and
using said stitched manifest at the client to request the combination of the different video assets in sequence for sequential playback as one continuous video stream in an order specified by the stitched manifest;
the identifiers comprising uniform resource locators (URLs) which are used to identify the video assets in the stitched manifest;
creating a new URL for each video asset;
creating one of a database or a fixed mapping associating the new URL with an original URL for each video asset;
combining the new URLs for the video assets on the stitched manifest;
identifying the original URLs associated with the new URLs; and
and requesting the video assets corresponding to the identified new URLs from a source location.

14. An apparatus for combining assets for a streaming video signal in a video distribution environment, wherein:
one or more video servers store, for each of a plurality of video programs, several versions of each of the video programs comprised of sets of fragmented files pre-encoded at correspondingly different bit rates, codecs or resolutions in an adaptive bit rate format, each set of the fragmented files being identified in a corresponding manifest file stored together therewith;
one or more content servers store, for each of a plurality of additional video content files, several versions of each of the additional video content files comprised of sets of fragmented files pre-encoded at correspondingly different bit rates, codecs or resolutions in an adaptive bit rate format, each set of the fragmented files of the additional video content files being identified in a corresponding additional manifest file stored together therewith;
the manifest files and the additional manifest files identify a source location of the corresponding sets of video fragments and additional video fragments;
an asset list identifies the video programs and the additional video content files as video assets;
the comprises apparatus comprising:
a manifest combiner for ingesting the asset list, the manifest files, and the additional manifest files and responding with a stitched manifest, the stitched manifest comprising identifiers for one or more of the video fragments or the additional video fragments of one or more of the video assets;

the manifest combiner providing the stitched manifest to a client in response to a client request for the stitched manifest, the stitched manifest being used at the client to request the one or more fragments of the video assets for playback; and a fragment proxy for obtaining the one or more fragments of the video assets from the one or more video servers or the one or more content servers and delivering the one or more fragments of the video assets in sequence to the client for sequential playback as one continuous video stream in an order specified by the stitched manifest; wherein: the identifiers comprise uniform resource locators (URLs) which are used to identify the video fragments and the additional video fragments in the stitched manifest;

a new URL is created for each video fragment and each additional video fragment;

the apparatus further comprises one of an additional database or a fixed mapping associating the new URL with an original URL for each video fragment and additional video fragment;

the manifest combiner combines the new URLs for the video fragments and additional video fragments on the stitched manifest;

a client request is received at the fragment proxy;

the fragment proxy identifies the original URL associated with the new URL via communications with the additional database or the fixed mapping;

and the fragment proxy requests the video fragment or additional video fragment corresponding to the identified new URL from the one or more video servers or from the one or more content servers.

15. An apparatus in accordance with claim 14, wherein:
the URLs are timestamp-based, each of the video fragments or the additional video fragments having a corresponding timestamp;
modified timestamps are provided to each new URL; and
the timestamps of the new URLs are modified to account for a duration of a previous video fragment or additional video fragment.

16. An apparatus in accordance with claim 14, wherein:
the URLs are sequence number-based URLs, each of the video fragments or the additional video fragments having a corresponding sequence number;
modified sequence numbers are provided to each new URL;
the sequence numbers of the new URLs are modified to increase with each of the fragments of the one or more video assets identified on the stitched manifest in sequential order of playback; and
the additional database or the fixed mapping maps the modified sequence numbers to the original sequence numbers to enable retrieval of the requested content.

17. An apparatus in accordance with claim 14, wherein:
a plurality of the apparatus for combining assets for a streaming video signal are provided in a video-on-demand system;
playlist servers are provided to serve the stitched manifest to clients;
load information is passed from each of the apparatus to the playlist servers; and
high-bandwidth-using apparatus are load balanced by enabling the low-bandwidth-using and externally load-balanced playlist servers to select a lightly loaded apparatus from the plurality of apparatus for delivery of the one or more video assets.

18. An apparatus in accordance with claim 14, wherein:
two versions of each video asset are provided to the apparatus, the fragments of each version having a different watermark embedded therein; and
a unique sequence is created at the apparatus comprised of watermarked fragments from the two versions of the watermarked video assets in order to send a different unique sequence to each client.

19. An apparatus in accordance with claim 14, wherein:
the additional video content files comprise advertisements;
a placeholder is provided in the asset list in place of information identifying the additional video content;
upon receipt of the request for a stitched manifest from the client, a specific advertisement is selected for communication to the client that is related to the client or the one or more video assets subject to the request;
the stitched manifest is created by substituting identification information for the specific advertisement into the asset list in place of the placeholder;
the stitched manifest is provided to the client in response to the request for the stitched manifest; and
the stitched manifest is used by the client to play back the requested video asset and the specific advertisement.

* * * * *

UNITED STATES PATENT AND TRADEMARK OFFICE
CERTIFICATE OF CORRECTION

| | | |
|---|---|---|
| PATENT NO. | : 8,887,215 B2 | Page 1 of 1 |
| APPLICATION NO. | : 13/826421 | |
| DATED | : November 11, 2014 | |
| INVENTOR(S) | : Yuval Fisher | |

It is certified that error appears in the above-identified patent and that said Letters Patent is hereby corrected as shown below:

In the Claims:

Column 12, line 65: "the comprises apparatus comprising:" should read

-- the apparatus comprising: --

Signed and Sealed this
Twenty-fourth Day of February, 2015

Michelle K. Lee
*Deputy Director of the United States Patent and Trademark Office*